United States Patent
Takata et al.

(10) Patent No.: US 10,527,776 B2
(45) Date of Patent: Jan. 7, 2020

(54) DISPLAY DEVICE

(71) Applicant: Panasonic Intellectual Property Management Co., Ltd., Osaka (JP)

(72) Inventors: Kazumasa Takata, Osaka (JP); Wahei Agemizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/183,776

(22) Filed: Nov. 8, 2018

(65) Prior Publication Data

US 2019/0154903 A1 May 23, 2019

(30) Foreign Application Priority Data

Nov. 21, 2017 (JP) .................................. 2017-223237
Jul. 23, 2018 (JP) .................................. 2018-137306

(51) Int. Cl.
*F21V 8/00* (2006.01)

(52) U.S. Cl.
CPC ........... *G02B 6/0053* (2013.01); *G02B 6/006* (2013.01); *G02B 6/0035* (2013.01); *G02B 6/0036* (2013.01); *G02B 6/0043* (2013.01); *G02B 6/0055* (2013.01); *G02B 6/0061* (2013.01); *G02B 6/0068* (2013.01); *G02B 6/0091* (2013.01)

(58) Field of Classification Search
CPC .. G02B 6/0053; G02B 6/0035; G02B 6/0036; G02B 6/0043; G02B 6/0055; G02B 6/006; G02B 6/0061; G02B 6/0068; G02B 6/0091

USPC .......................................................... 362/613
See application file for complete search history.

(56) References Cited

U.S. PATENT DOCUMENTS

2005/0259440 A1* 11/2005 Onishi .................. G02B 6/0036
                                                        362/613
2007/0127264 A1*  6/2007 Sugiura ................ G02B 6/0038
                                                        362/613

(Continued)

FOREIGN PATENT DOCUMENTS

JP      2007-115439      5/2007
JP      2016-053605      4/2016

(Continued)

OTHER PUBLICATIONS

Extended European Search Report dated Apr. 16, 2019 in European Application No. 18200664.3.

*Primary Examiner* — Bryon T Gyllstrom
(74) *Attorney, Agent, or Firm* — Wenderoth, Lind & Ponack, L.L.P.

(57) ABSTRACT

A display device includes a light guide plate, a first light source, a second light source, and a light transmitting portion. The light guide plate includes a first reflecting prism and a second reflecting prism. The first reflecting prism has an inclined surface that reflects the light incident from the first side surface toward the main surface. The second reflecting prism has an inclined surface that reflects the light incident from the second side surface toward the main surface. The longitudinal direction of the inclined surface of the first reflecting prism is parallel or substantially parallel to a line connecting the second light source and the inclined surface of the first reflecting prism.

11 Claims, 11 Drawing Sheets

(56) References Cited

U.S. PATENT DOCUMENTS

| | | | | |
|---|---|---|---|---|
| 2008/0316744 | A1* | 12/2008 | Hirota | G02B 5/021 |
| | | | | 362/247 |
| 2012/0051088 | A1* | 3/2012 | Chui | G02B 6/0036 |
| | | | | 362/608 |
| 2016/0306098 | A1* | 10/2016 | Fujita | G02B 6/0036 |
| 2017/0146721 | A1* | 5/2017 | Fukui | G09F 13/18 |

FOREIGN PATENT DOCUMENTS

| | | |
|---|---|---|
| JP | 2016-180823 | 10/2016 |
| JP | 2016-206240 | 12/2016 |
| WO | 2014/069730 | 5/2014 |

\* cited by examiner

DISPLAY DEVICE

BACKGROUND

1. Technical Field

The present disclosure relates to a display device that displays information such as letters, figures, patterns, and the like in an electric device or the like.

2. Description of the Related Art

In the related art, this type of display device is disclosed in, for example, Japanese Patent Unexamined Publication No. 2016-180823.

Figure 12A:
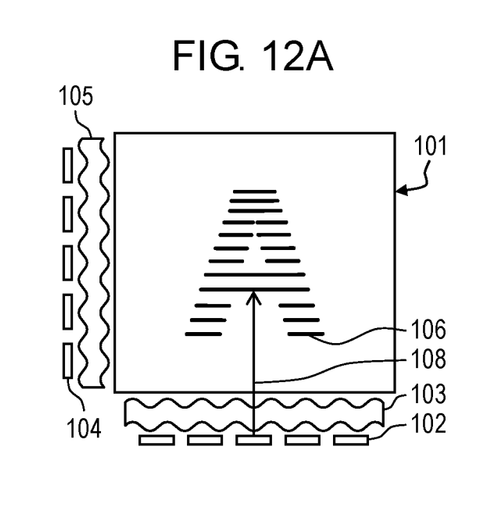
FIG. 12A is a schematic plan view of a display device of the related art.
Figure 12B:
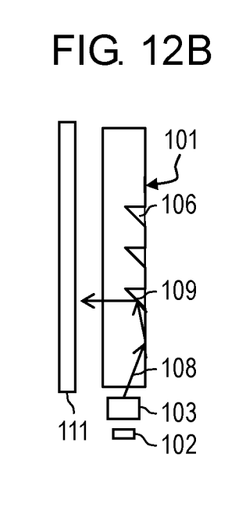
FIG. 12B is a schematic cross-sectional view of the display device of the related art.
Figure 12C:
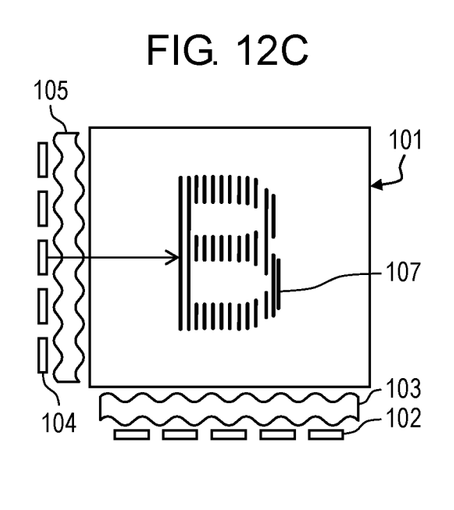
FIG. 12C is a schematic plan view of the display device of the related art.

The display device shown in FIGS. 12A to 12C includes light guide plate 101, light sources 102 and 104 such as LEDs, and lenses 103 and 105. On the bottom surface of light guide plate 101, an aggregate of minute reflecting prisms 106 and an aggregate of minute reflecting prisms 107 are formed.

Light from light source 102 enters light guide plate 101 via lens 103. Light from light source 104 enters light guide plate 101 via lens 105. Lenses 103 and 105 diffuse the light from light sources 102 and 104 and serve to allow light to be incident from the side surface of light guide plate 101 with uniform intensity. Each of light sources 102 and 104 is configured with a plurality of light sources arranged along the side surface of light guide plate 101.

As shown in FIGS. 12A and 12B, the aggregate of reflecting prisms 106 is formed with, for example, a letter "A" as a pattern by a side substantially perpendicular to the direction of incidence of light from light source 102 of light guide plate 101. The aggregate of reflecting prisms 107 is formed with, for example, a letter "B" as a pattern, by a side substantially perpendicular to the direction of incidence of light from light source 104 of light guide plate 101.

Light 108 emitted from light source 102 enters from the side surface of light guide plate 101 through lens 103, propagates while reflecting inside light guide plate 101, is reflected by inclined surface 109 of reflecting prism 106, and is emitted from light guide plate 101 in the front direction. As a result, when light guide plate 101 is viewed from the front, the letter "A" is displayed on the main surface as shown in FIG. 12A.

Light emitted from light source 104 enters from the side surface of light guide plate 101 through lens 105, propagates while reflecting inside light guide plate 101, is reflected by the inclined surface of reflecting prism 107, and is emitted from light guide plate 101 in the front direction. As a result, when light guide plate 101 is viewed from the front, the letter "B" is displayed on the main surface as shown in FIG. 12C.

In this way, the pattern displayed on light guide plate 101 may be switched depending on whether light source 102 is turned on or light source 104 is turned on.

Furthermore, when light scattering sheet 111 is placed on the light emitting side of light guide plate 101 as shown in FIG. 12B, in a state in which neither of light sources 102 and 104 is turned on, even if external light is incident on the main surface of light guide plate 101, sheet 111 scatters and reflects external light. This makes it difficult for light guide plate 101 to be seen through sheet 111.

SUMMARY

A display device of the present disclosure includes a light guide plate, a first light source, a second light source, and a light transmitting portion.

The light guide plate includes a main surface, a bottom surface, a first side surface, a second side surface, a first reflecting prism, and a second reflecting prism.

The bottom surface is opposite to the main surface.

The first side surface is formed between the main surface and the bottom surface.

The second side surface is formed between the main surface and the bottom surface and intersects with the first side surface.

The first reflecting prism includes an inclined surface that reflects the light incident on the bottom surface from the first side surface toward the main surface.

The second reflecting prism includes an inclined surface that reflects the light incident on the bottom surface from the second side surface toward the main surface.

The first light source causes light to be incident on the first side surface of the light guide plate.

The second light source causes light to be incident on the second side surface of the light guide plate.

The light transmitting portion is placed on a side of the main surface of the light guide plate, and transmits and scatters the light emitted from the main surface.

The longitudinal direction of the inclined surface of the first reflecting prism is parallel or substantially parallel to a line connecting the second light source and the inclined surface of the first reflecting prism.

In addition, a display device according to another embodiment of the present disclosure includes a light guide plate, a first light source, a second light source, and a light transmitting portion.

The light guide plate includes a main surface, a bottom surface, a side surface, and a reflecting prism.

The bottom surface is opposite to the main surface.

The side surface is formed between the main surface and the bottom surface.

The reflecting prism includes an inclined surface that reflects the light incident on the bottom surface from the side surface toward the main surface.

The first light source and the second light source cause light to be incident on the side surface of the light guide plate at mutually different angles.

The light transmitting portion is placed on a side of the main surface of the light guide plate, and transmits and scatters the light emitted from the main surface.

The reflecting prism of the light guide plate includes the first reflecting prism and the second reflecting prism.

The first reflecting prism reflects the light incident from the first light source on the inclined surface to the side of the main surface of the light guide plate.

The second reflecting prism reflects the light incident from the second light source on the inclined surface to the side of the main surface of the light guide plate.

The longitudinal direction of the inclined surface of the first reflecting prism is parallel or substantially parallel to a line connecting the second light source and the inclined surface of the first reflecting prism.

In addition, a display device according to still another embodiment of the present disclosure includes a light guide plate, a light source, and a light transmitting portion.

The light guide plate propagates the light incident from the end surface, reflects the light on a plurality of reflecting prisms, and emits the light from the main surface.

The light source causes light to be incident on the end surface of the light guide plate.

The light transmitting portion is provided on a side of the main surface of the light guide plate and transmits light emitted from the main surface.

The light source is configured with a plurality of light sources having different lighting timings.

Each of the plurality of reflecting prisms is placed so that the longitudinal direction thereof and a direction connecting the light source to which the reflecting prism does not face and the reflecting prism are parallel or substantially parallel.

BRIEF DESCRIPTION OF THE DRAWINGS

FIG. 4B is a cross-sectional view in a case where the first light source of the display device according to Embodiment 1 is turned on;

DETAILED DESCRIPTION

In FIGS. 12A to 12C, the light reflected from light source 102 by reflecting prism 106 and emitted therefrom is not only the light traveling toward the front of light guide plate 101. There is also light obliquely incident on reflecting prism 106. This light is reflected by reflecting prism 106 and travels in an oblique direction deviated from the front. Light deviated from this front direction may not be seen from the front direction of light guide plate 101.

Likewise, the light reflected from light source 104 by reflecting prism 107 and emitted therefrom is not only the light traveling toward the front of light guide plate 101. There is light obliquely incident on reflecting prism 107. This light is reflected by reflecting prism 107 and travels in an oblique direction deviated from the front. Light deviated from this front direction may not be seen from the front direction of light guide plate 101.

Here, a case where light source 104 is turned on to display the letter "B" will be described as an example.

Figure 13A:
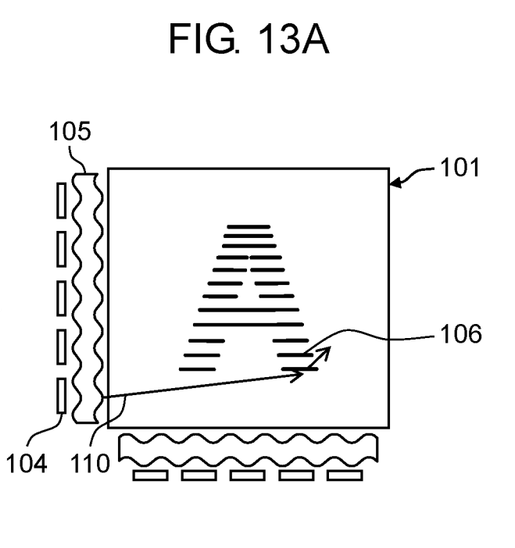
FIG. 13A is a schematic plan view of the display device of the related art.
Figure 13B:
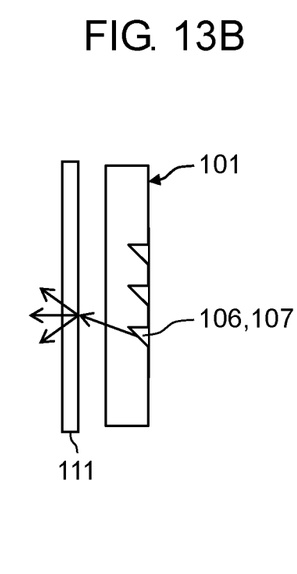
FIG. 13B is a schematic cross-sectional view of the display device of the related art.
Figure 13C:
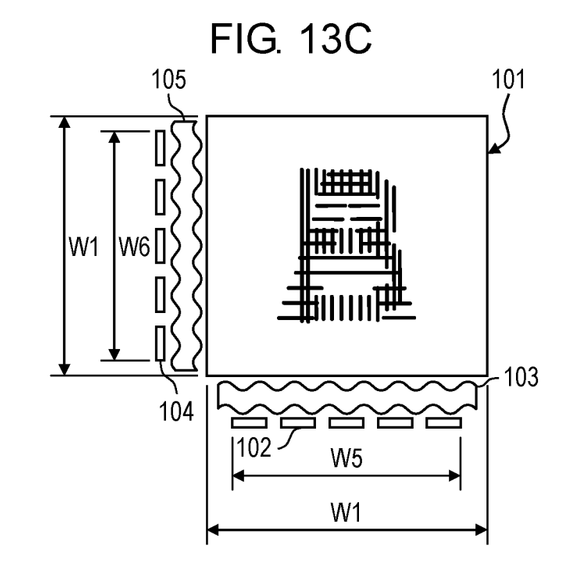
FIG. 13C is a schematic plan view of the display device of the related art.

In this case, as shown in FIG. 13A, since light 110 obliquely incident from light source 104 exists on reflecting prism 106 for displaying letter "A", as shown in FIG. 13B, the light reflected obliquely from reflecting prism 106 is scattered and reflected by sheet 111 and may be seen from the front direction of light guide plate 101. That is, as shown in FIG. 13C, an unnecessary pattern letter "A" may appear thin during the display of the letter "B".

Hereinafter, each embodiment of the present disclosure will be described with reference to drawings.

Embodiment 1

Figure 1A:
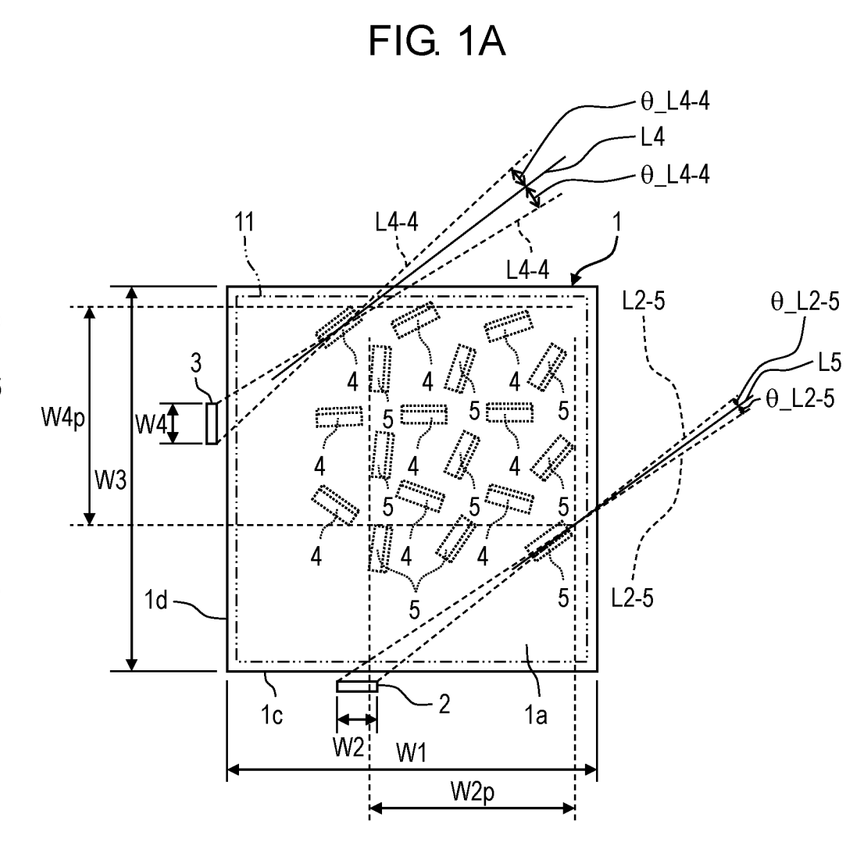
FIG. 1A is a schematic plan view of a display device according to Embodiment 1.

FIG. 1A to FIG. 7 show a display device according to Embodiment 1 of the present disclosure. FIG. 1A shows a front view of the display device. FIG. 1B shows a cross-sectional view of the display device.

Figure 1B:
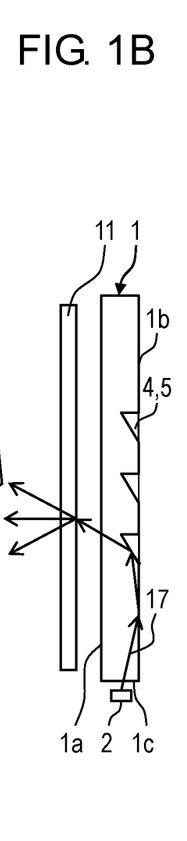
FIG. 1B is a schematic cross-sectional view of the display device according to Embodiment 1.

The display device includes light guide plate 1, first light source 2, second light source 3, and light transmitting portion 11 that transmits and scatters light. First light source 2 and second light source 3 are configured with light emitting diode (LED) or the like.

Light guide plate 1 has main surface 1a, bottom surface 1b opposite to main surface 1a, first side surface 1c and second side surface 1d formed between main surface 1a and bottom surface 1b. On bottom surface 1b, first reflecting prism 4 and second reflecting prism 5 are formed. As also shown in FIG. 1B, both of first reflecting prism 4 and second reflecting prism 5 are concave portions formed on bottom surface 1b of light guide plate 1 and have first inclined surface 14 having angle θa with respect to bottom surface 1b and second inclined surface 15 having angle θb with respect to bottom surface 1b.

In Embodiment 1, width W2 of first light source 2 is narrower than width W1 of first side surface 1c of light guide plate 1. Width W4 of second light source 3 is narrower than width W3 of second side surface 1d of light guide plate 1. On the other hand, in the example of the related art shown in FIG. 12, both width W5 of one light source configured with a plurality of light sources 102 and width W6 of the other light source configured with a plurality of light sources 104 are substantially the same as width W1 of the side surface of light guide plate 101. In the example of the related art, these light sources are configured to illuminate the entire width of the side surface of light guide plate 101.

Figure 2A:
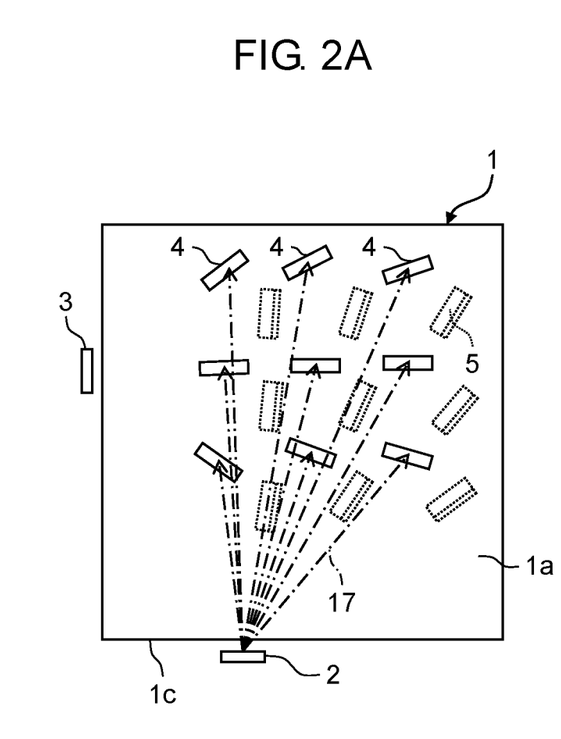
FIG. 2A is a diagram for describing a state of light reflected by a first inclined surface of a first reflecting prism of the display device according to Embodiment 1.

As shown in FIG. 2A, first light source 2 radiates light toward first side surface 1c of light guide plate 1. Light 17 guided into light guide plate 1 from first side surface 1c propagates inside light guide plate 1.

Figure 2B:
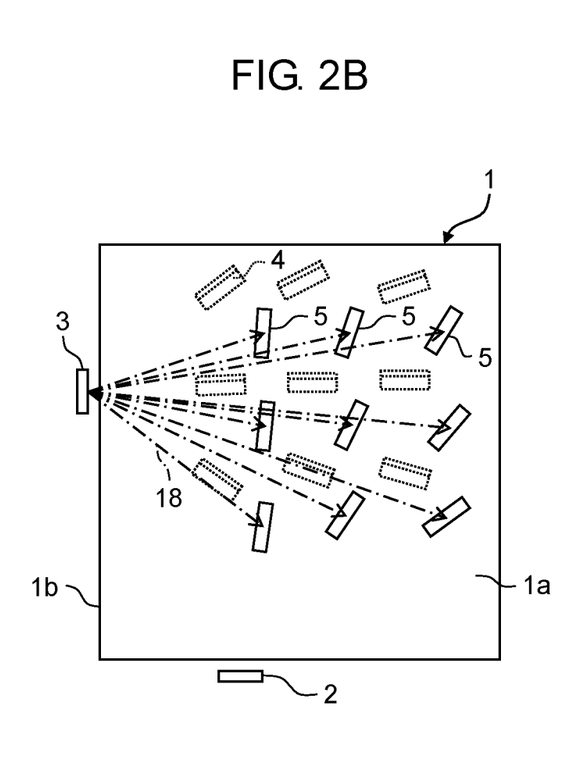
FIG. 2B is a diagram for describing a state of light reflected by the first inclined surface of a second reflecting prism of the display device according to Embodiment 1.

As shown in FIG. 2B, second light source 3 radiates light toward second side surface 1d of light guide plate 1. Light 18 guided into light guide plate 1 from second side surface 1d propagates inside light guide plate 1.

A plurality of first reflecting prisms 4 are placed so as to receive the light from first light source 2 by first inclined surface 14 and reflect the light to main surface 1a of light guide plate 1. A plurality of second reflecting prisms 5 are placed so as to receive the light from second light source 3 by first inclined surface 14 and reflect the light to main surface 1a of light guide plate 1.

As shown in FIG. 1A, the width of the region where second reflecting prism 5 is placed as viewed from first light source 2 side is W2p, and the width of the region where first reflecting prism 4 is placed as viewed from second light source 3 side is W4p. In addition, it is assumed that a line along the longitudinal direction of second reflecting prism 5 is L5, a line connecting the end of the light emitting portion of first light source 2 and the center of the reflecting surface of second reflecting prism 5 is L2-5, and the angle formed between line L5 and line L2-5 is θ_L2-5. Likewise, it is assumed that a line along the longitudinal direction of first reflecting prism 4 is L4, a line connecting the end of the light emitting portion of second light source 3 and the center of the reflecting surface of first reflecting prism 4 is L4-4, and the angle formed between line L4 and line L4-4 is θ_L4-4.

With such a configuration, as shown in FIG. 2A, in a state in which first light source 2 is turned on and second light source 3 is turned off, light 17 is reflected by first inclined surface 14 of first reflecting prism 4, is emitted from main surface 1a of light guide plate 1 as shown in FIG. 1B, and is scattered and displayed by light transmitting portion 11.

As shown in FIG. 2B, in a state in which second light source 3 is turned on and first light source 2 is turned off, light 18 is reflected by first inclined surface 14 of second reflecting prism 5, is emitted from main surface 1a of light guide plate 1, and is scattered and displayed by light transmitting portion 11.

Figure 3A:
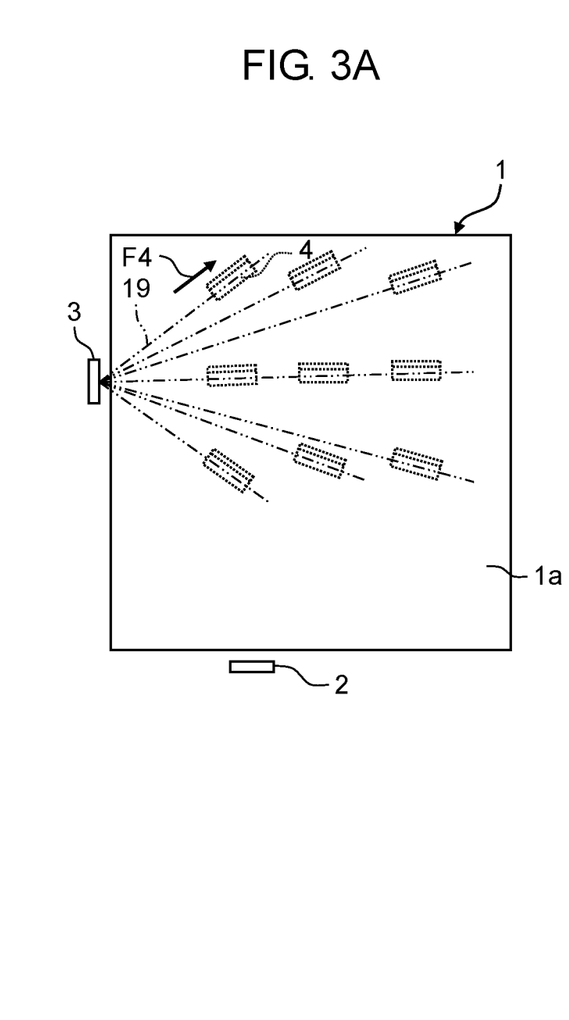
FIG. 3A is an explanatory diagram of a line connecting a second light source and a center of the first reflecting prism along a longitudinal direction of the first reflecting prism of the display device according to Embodiment 1.
Figure 3B:
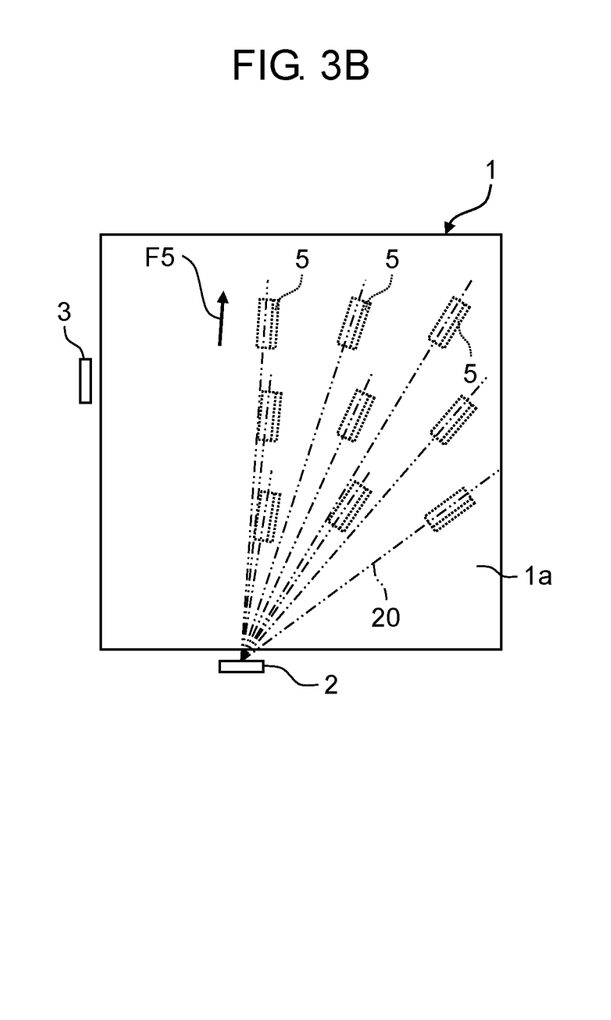
FIG. 3B is an explanatory diagram of a line connecting first light source 2 and a center of the second reflecting prism along the longitudinal direction of the second reflecting prism of the display device according to Embodiment 1.

Furthermore, first reflecting prism 4 is placed such that longitudinal direction F4 of first inclined surface 14 and line 19 connecting second light source 3 and the center (the center of the prism) of first inclined surface 14 of first reflecting prism 4 are parallel as shown in FIG. 3A. Second reflecting prism 5 is placed such that longitudinal direction F5 of first inclined surface 14 and line 20 connecting first light source 2 and the center (the center of the prism) of first inclined surface 14 of second reflecting prism 5 are parallel as shown in FIG. 3B.

Figure 4A:
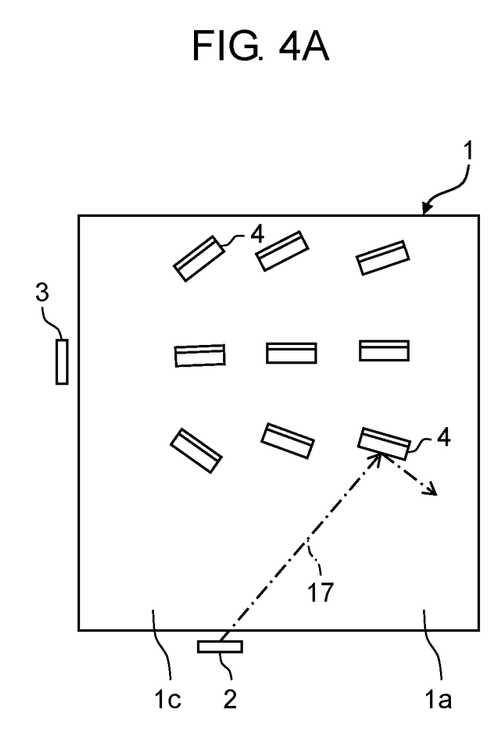
FIG. 4A is an explanatory diagram of light from the first light source of the display device according to Embodiment 1.
Figure 4B:
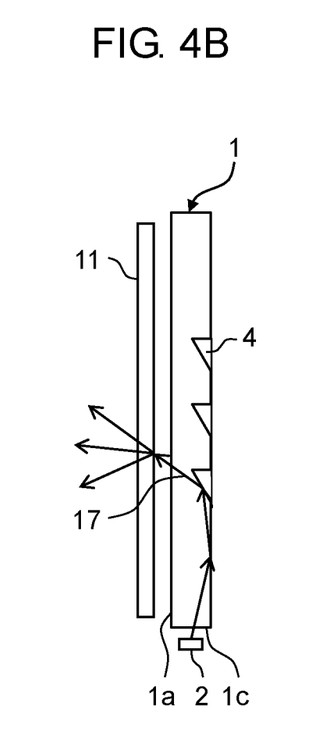

The behavior of light in light guide plate 1 in this case will be described with reference to FIGS. 4A to 4C. FIGS. 4A and 4B show how the light propagates when first light source 2 is turned on and second light source 3 is turned off.

Light 17 emitted from first light source 2 having width W2 narrower than width W1 of first side surface 1c of light guide plate 1 enters from first side surface 1c of light guide plate 1 and propagates inside light guide plate 1. Light 17 reflected by first inclined surface 14 of first reflecting prism 4 is released from the front of light guide plate 1 but is emitted to main surface 1a side of light guide plate 1. Since light 17 is scattered and diffused by light transmitting portion 11 provided on light guide plate 1, light 17 may be recognized from the front. Since such a phenomenon occurs in the entire aggregate of first reflecting prisms 4, it is possible to recognize a pattern as an aggregate.

Figure 4C:
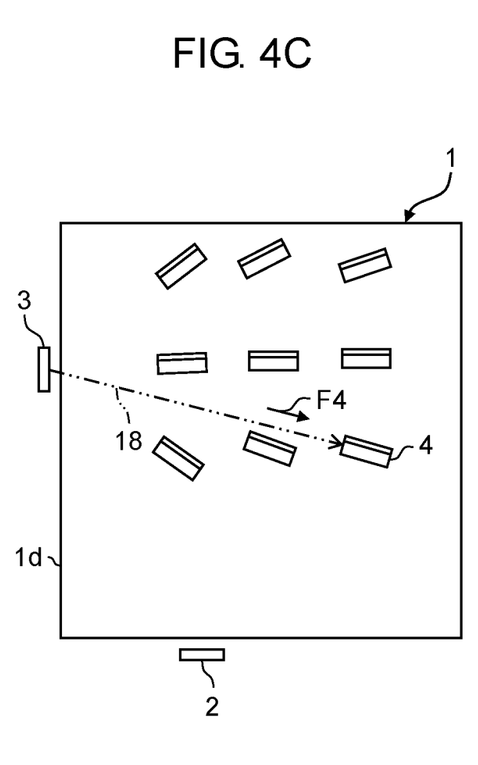
FIG. 4C is an explanatory diagram of light from the second light source of the display device according to Embodiment 1.

When second light source 3 is turned on and first light source 2 is turned off, light 18 enters from second side surface 1d of light guide plate 1 and travels toward first reflecting prism 4 as shown in FIG. 4C. As described above, since longitudinal direction F4 of first reflecting prism 4 is parallel to line 19 connecting first reflecting prism 4 and second light source 3, light 18 from second light source 3 is not reflected by first inclined surface 14 of first reflecting prism 4 or even if the light is reflected, only a very slight angular change occurs. Therefore, light 18 does not jump out from main surface 1a of light guide plate 1 even after reaching first reflecting prism 4.

Likewise, when first light source 2 is turned on and second light source 3 is turned off, light 17 enters from first side surface 1c of light guide plate 1 and travels toward second reflecting prism 5. However, since longitudinal direction F5 of second reflecting prism 5 is parallel to line 20 connecting second reflecting prism 5 and first light source 2, light 17 from first light source 2 is not reflected by first inclined surface 14 of second reflecting prism 5, or even if the light is reflected, only a very slight angular change occurs. Therefore, light 17 does not jump out from main surface 1a of light guide plate 1 even after reaching second reflecting prism 5.

In this way, it is possible to prevent an unnecessary pattern from being displayed by the reflecting prism arranged so that the longitudinal direction of each reflecting prism and the direction connecting the light source to which the reflecting prism does not face (correspond) and the reflecting prism are parallel to each other. Here, light source 2 and light source 3 are configured to have different lighting timings.

Figure 5A:
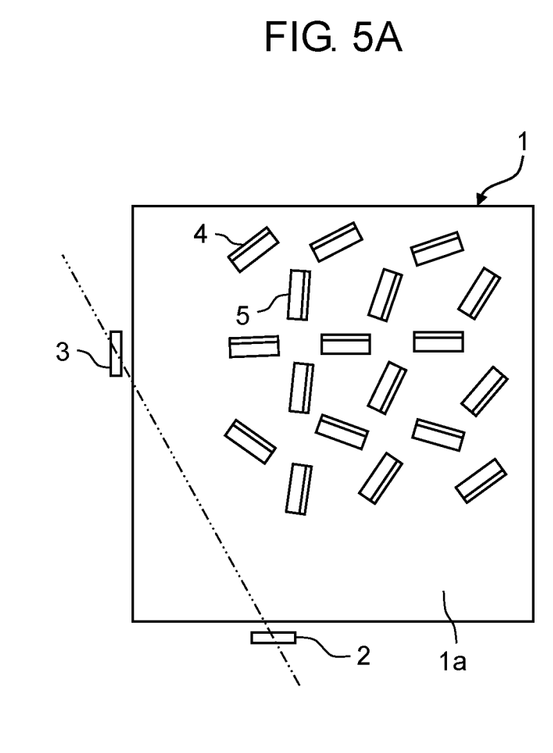
FIG. 5A is an explanatory diagram of a placement position of the first reflecting prism and the second reflecting prism of the display device according to Embodiment 1.
Figure 5B:
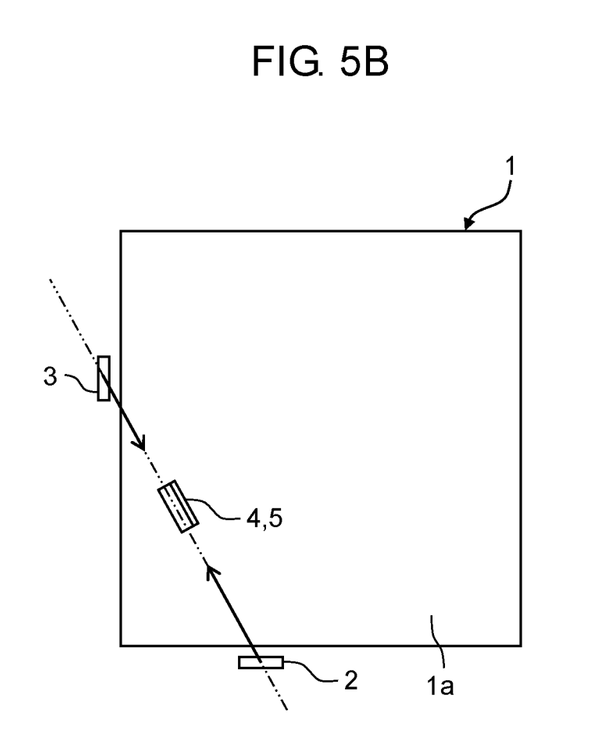
FIG. 5B is an explanatory diagram of a placement position of the first reflecting prism and the second reflecting prism of the display device according to Embodiment 1.

As shown in FIG. 5A, first reflecting prism 4 and second reflecting prism 5 are not placed on a straight line connecting the centers of first light source 2 and second light source 3. This is because, as shown in FIG. 5B, when a prism is placed on a straight line connecting the light sources, light from any light source is not reflected by first inclined surface 14 and may not be emitted from light guide plate 1.

Figures 6A, 6B:
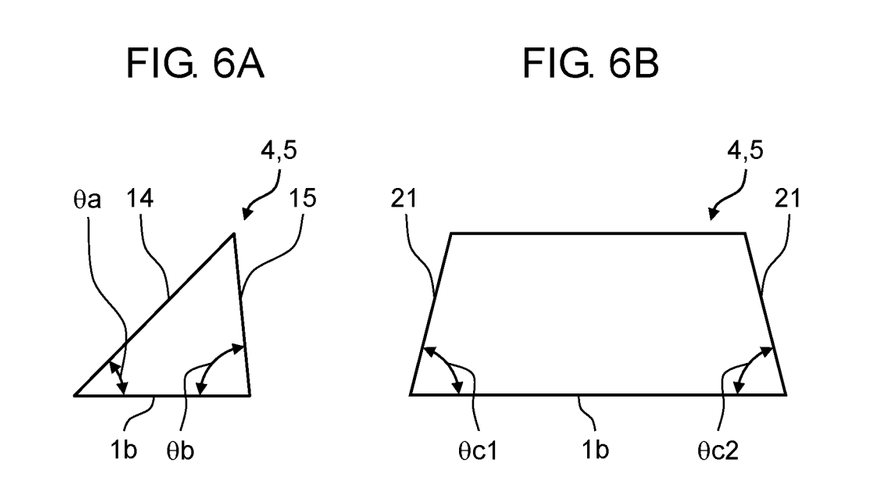
FIG. 6A is an explanatory diagram of a shape of the first reflecting prism or the second reflecting prism of the display device according to Embodiment 1.
FIG. 6B is an explanatory diagram of a shape of the first reflecting prism or the second reflecting prism of the display device according to Embodiment 1.

It is preferable that the shapes of first reflecting prism 4 and second reflecting prism 5 have the shape as shown in FIGS. 6A and 6B. FIG. 6A is a diagram showing the cross-sectional shape of the prism, and FIG. 6B is a diagram of the reflecting prism as viewed from first inclined surface 14, showing the shape of the reflecting prism in the longitudinal direction. Angles θc1 and θc2 are the angles of the side surfaces (side walls) 21 on both sides of the reflecting prism.

In order to cause the light from first light source 2 and second light source 3 to be reflected by first inclined surface 14 of the reflecting prism and to be emitted from main surface 1a of light guide plate 1, and to prevent light striking the side surface 21 of the reflecting prism from being emitted from light guide plate 1, the following relationships are necessary.

$\theta a < \theta c1$ $\theta a < \theta c2$

Furthermore, the following is desirable.

$\theta c1 > 70°$ $\theta c2 > 70°$

When angles $\theta c1$ and $\theta c2$ of side surfaces 21 on both sides of the reflecting prism become smaller than 70°, a component that emits light striking side surface (side wall) 21 to main surface 1a side of light guide plate 1 is generated.

In addition, it is desirable that angles $\theta c1$ and $\theta c2$ of side surfaces 21 on both sides of reflecting prism are less than 90°. When angles $\theta c1$ and $\theta c2$ are 90° or more, there arises a problem that the mold does not come off when mass-producing by molding, and mass-production by molding is not possible.

Furthermore, it is preferable that angle $\theta a$ is greater than 35° and smaller than 65° (that is, 35°<$\theta a$<65°). In a case where angle $\theta a$ is out of this range, the action of reflecting the light incident on light guide plate 1 toward main surface 1a of light guide plate 1 becomes extremely small.

Figure 1C:
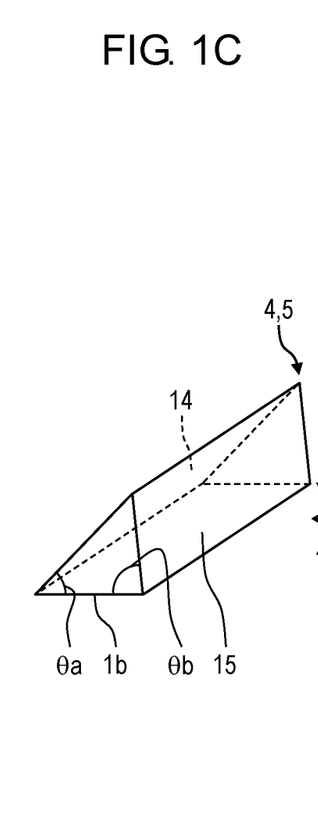
FIG. 1C is an enlarged perspective view of a prism of the display device according to Embodiment 1.
Figure 7:
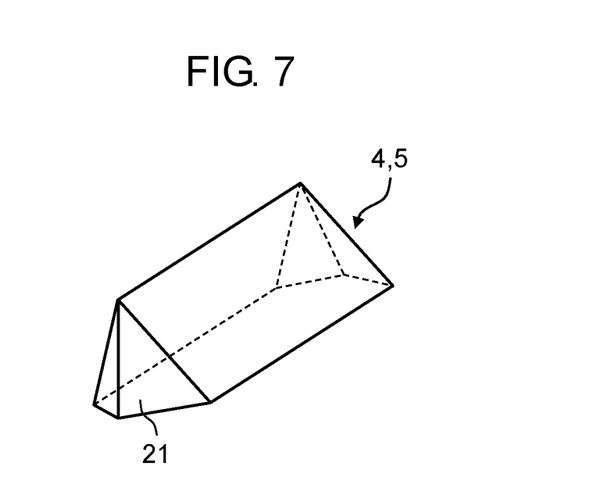
FIG. 7 is a perspective view showing another shape of the first reflecting prism or the second reflecting prism of the display device according to Embodiment 1.

First reflecting prism 4 and second reflecting prism 5 may have a reflecting surface even if the cross section is not the triangular prism shown in FIG. 1C and may have a plurality of side surfaces 21 as shown in FIG. 7. The cross section may be trapezoidal. In addition, the reflecting surface may have a slightly curved surface.

In this way, longitudinal direction F4 of first reflecting prism 4 and line 19 connecting the center of second light source 3 and the center of first reflecting prism 4 are parallel, and width W4 of second light source 3 is narrower than width W3 of second side surface 1d of light guide plate 1. As a result, the light obliquely incident on first reflecting prism 4 from second light source 3 becomes very small. Therefore, it is possible to avoid the unnecessary pattern letter "A" appearing thin during the display of the letter "B", and the letter "B" is clearly displayed.

In addition, longitudinal direction F5 of second reflecting prism 5 and line 20 connecting the center of first light source 2 and the center of second reflecting prism 5 are parallel, and width W2 of first light source 2 is narrower than width W1 of first side surface 1c of light guide plate 1. As a result, the light obliquely incident on second reflecting prism 5 from first light source 2 becomes very small. Therefore, it is possible to avoid the unnecessary pattern letter "B" appearing thin during the display of letter "A", and the letter "A" is clearly displayed.

Specifically, it is preferable that W1/2≥W2 and W3/2≥W4 so that width W2 of first light source 2 is narrower than width W1 of first side surface 1c of light guide plate 1, and width W4 of second light source 3 is narrower than width W3 of second side surface 1d of light guide plate 1. When width W2 is larger than W1/2, even if the reflecting prism is directed to the center of the light source, the light from the light source located at the end is reflected by the reflecting prism, is emitted from light guide plate 1, and appears as an unnecessary pattern. When width W4 is larger than W3/2, even if the reflecting prism is directed to the center of the light source, the light from the light source located at the end is reflected by the reflecting prism, is emitted from light guide plate 1, and appears as an unnecessary pattern.

Furthermore, it is desirable that the size of the light source is limited with respect to the size of the prism display region. Specifically, it is desirable that the following relationships hold between width W2 of first light source 2 and width W2p of the region where second reflecting prism 5 is placed, and between width W4 of second light source 3 and width W4p of the region where first reflecting prism 4 is placed.

$W2/W2p \leq \frac{1}{4}$ $W4/W4p \leq \frac{1}{4}$

When the width of the light source is large, the light emitted from the end of the light source is obliquely incident on the reflecting prism which is not to be displayed, this light is emitted from the light guide plate, and an unnecessary pattern is displayed.

Furthermore, it is desirable that the angle between the line segment connecting the end of the light source and the reflecting prism not to be displayed and the long side of the reflecting prism is limited. Specifically, it is assumed that a line along the longitudinal direction of second reflecting prism 5 is L5, a line connecting the end of the light emitting portion of first light source 2 and the center of the reflecting surface of second reflecting prism 5 is L2-5, and the angle formed between line L5 and line L2-5 is $\theta\_L2\text{-}5$. Likewise, when it is assumed that a line along the longitudinal direction of first reflecting prism 4 is L4, a line connecting the end of the light emitting portion of second light source 3 and the center of the reflecting surface of first reflecting prism 4 is L4-4, and the angle formed between line L4 and line L4-4 is $\theta\_L4\text{-}4$, it is desirable that the following relationships hold.

$|\theta\_L2\text{-}5| \leq 30°$ $|\theta\_L4\text{-}4| \leq 30°$

When these angles are large, light from the light source not to be displayed is emitted from the light guide plate, and an unnecessary pattern is displayed.

Embodiment 2

Figure 8A:
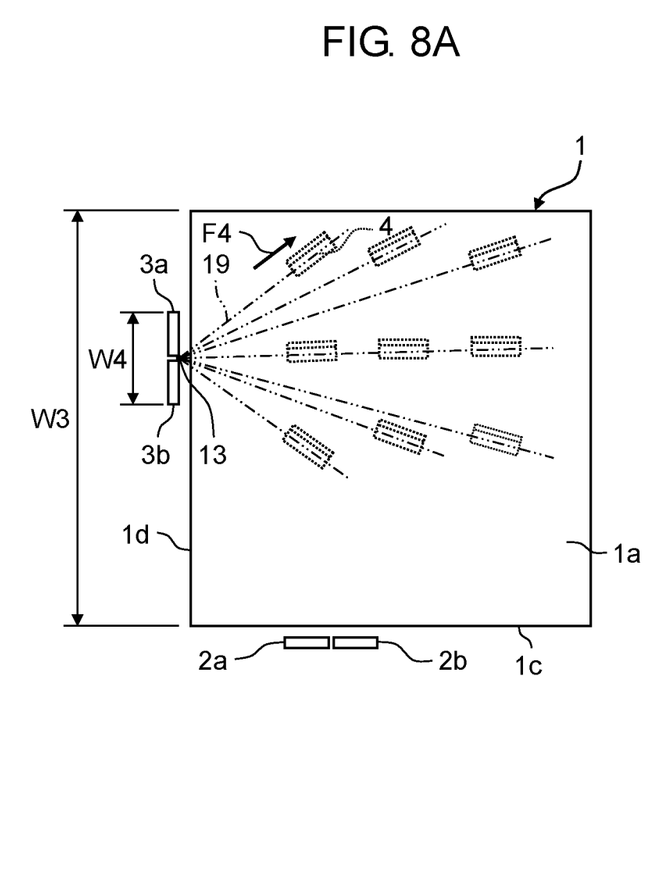
FIG. 8A is an explanatory diagram of a placement location of a first reflecting prism of a display device according to Embodiment 2.
Figure 8B:
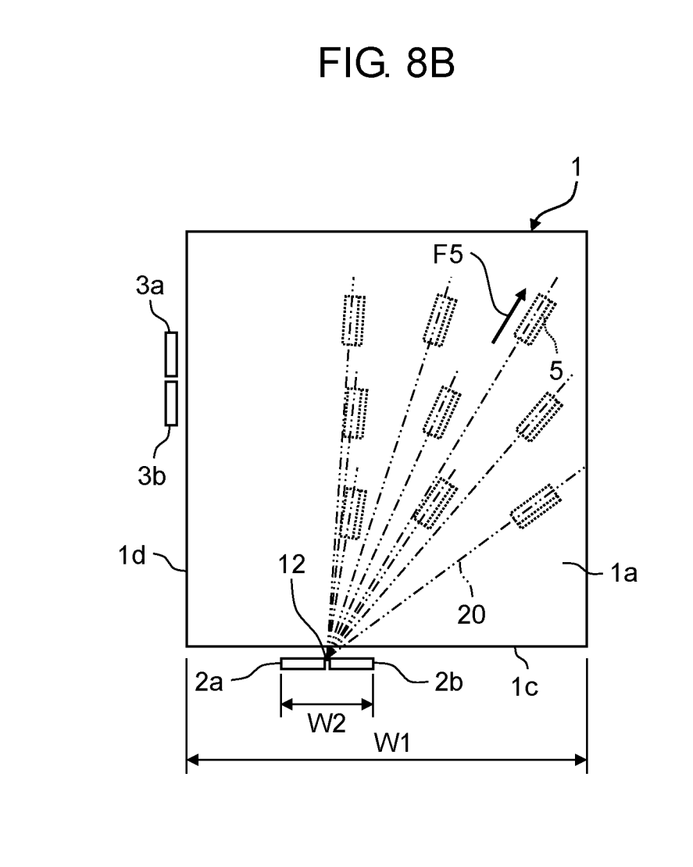
FIG. 8B is an explanatory diagram of a placement location of a second reflecting prism of the display device according to Embodiment 2.

FIGS. 8A and 8B show the placement of the reflecting prisms in a case where there are a plurality of light sources for displaying pictures in the display device according to Embodiment 2 of the present disclosure.

In the present embodiment, first light source 2 is configured with light sources 2a and 2b placed close to each other along first side surface 1c of light guide plate 1. Width W2 of first light source 2 configured with light sources 2a and 2b in the direction of first side surface 1c is narrower than width W1 of first side surface 1c of light guide plate 1. Second light source 3 is configured with light sources 3a and 3b placed close to each other along second side surface 1d of light guide plate 1. Width W4 of second light source 3 configured with light sources 3a and 3b in the direction of second side surface 1d is narrower than width W3 of second side surface 1d of light guide plate 1.

As shown in FIG. 8A, longitudinal direction F4 of first reflecting prism 4 is configured to be parallel to line 19 connecting center 13 of second light source 3 between light sources 3a and 3b and the center of first reflecting prism 4. As shown in FIG. 8B, longitudinal direction F5 of second reflecting prism 5 is configured to be parallel to line 20 connecting center 12 of first light source 2 between light sources 2a and 2b and the center of first inclined surface 14 (see FIG. 6A) of second reflecting prism 5. The others are the same as those in Embodiment 1.

Specifically, it is preferable that W1/2≥W2 and W3/2≥W4 so that width W2 of light sources 2a and 2b is narrower than width W1 of first side surface 1c of light guide plate 1, and width W4 of light sources 3a and 3b is narrower than width W3 of second side surface 1d of light guide plate 1. When width W2 is larger than W1/2, even if the reflecting prism is directed to the center of the light source, the light from the light source located at the end is reflected by the reflecting prism, is emitted from light guide plate 1, and appears as an unnecessary pattern. When width W4 is larger than W3/2, even if the reflecting prism is directed to the center of the light source, the light from the light source located at the end is reflected by the reflecting prism, is emitted from light guide plate 1, and appears as an unnecessary pattern.

In the present embodiment, it is possible to realize a display device that does not display an unnecessary picture in the same way as described in Embodiment 1.

In the present embodiment, it is desirable that the size of the light source is limited with respect to the size of the display region of the reflecting prism, as described in Embodiment 1. In addition, it is desirable that the angle between the line connecting the end of the light source and the reflecting prism not to be displayed and the long side (the side along the longitudinal direction) of the reflecting prism is limited.

Embodiment 3

Figure 9:
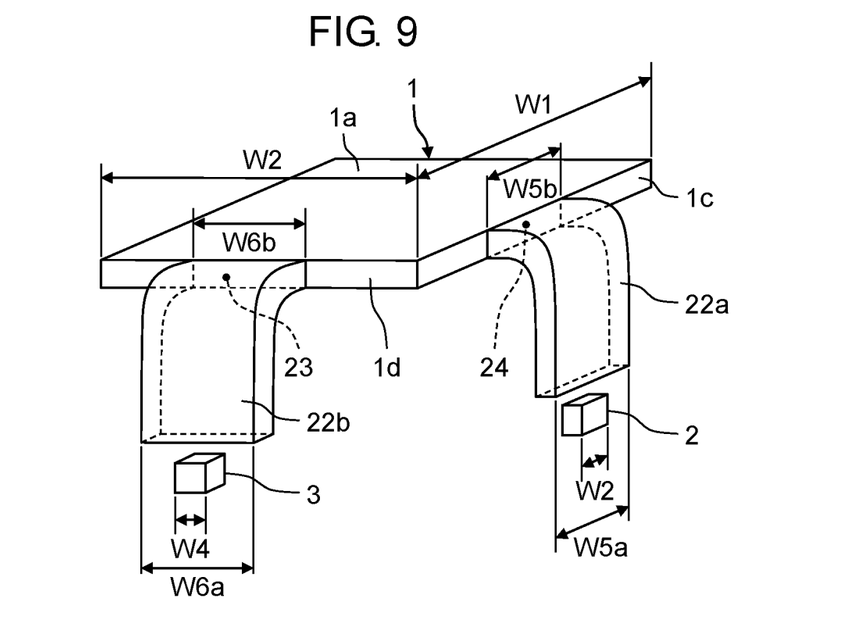
FIG. 9 is a perspective view of a light guide plate of a display device according to Embodiment 3.

FIG. 9 shows a display device according to Embodiment 3 of the present disclosure.

Light guide plate 1 of each of the above embodiments has a flat plate shape, and light from first light source 2 and second light source 3 is directly incident on light guide plate 1 through first side surface 1c and second side surface 1d. As shown in FIG. 9, light guide plate 1 of Embodiment 3 is different in that light from first light source 2 and second light source 3 is incident on light guide plate 1 through light incidence portions 22a and 22b.

Light guide plate 1 has stereoscopically curved light incidence portions 22a and 22b. Then, light from first light source 2 and second light source 3 is configured to enter the main body portion of light guide plate 1 from the tips (widths W5a and W6a) of light incidence portions 22a and 22b.

In this case, light guide plate 1 may be regarded as having a virtual light source. Width W5b of the base portion of light incidence portion 22a of light guide plate 1 is narrower than width W1 of first side surface 1c of light guide plate 1. Width W6b of the base portion of light incidence portion 22b of light guide plate 1 is narrower than width W2 of second side surface 1d of light guide plate 1. The others are the same as those in Embodiments 1 and 2.

Longitudinal direction F4 of first reflecting prism 4 is configured to be parallel to the line connecting center 23 of the base portion of light incidence portion 22b of light guide plate 1 and the center of first reflecting prism 4. Furthermore, longitudinal direction F5 of second reflecting prism 5 is configured to be parallel to the line connecting center 24 of the base portion of light incidence portion 22a of light guide plate 1 and the center of second reflecting prism 5. With this configuration, it is possible to realize a display device that does not display an unnecessary picture as described in Embodiment 1.

Specifically, it is preferable that W1/2≥W5b and W2/2≥W6b so that width W5b is narrower than width W1 and width W6b is narrower than width W2. When width W5b is larger than W1/2, even if the reflecting prism is directed to the center of the light source, the light from the light source located at the end is reflected by the reflecting prism, is emitted from light guide plate 1, and appears as an unnecessary pattern. When width W6b is larger than W2/2, even if the reflecting prism is directed to the center of the light source, the light from the light source located at the end of the light source group is reflected by the reflecting prism, is emitted from light guide plate 1, and appears as an unnecessary pattern.

In the present embodiment, it is desirable that the size of the light source is limited with respect to the size of the display region of the reflecting prism, as described in Embodiment 1. In addition, it is desirable that the angle between the line connecting the end of the light source and the reflecting prism not to be displayed and the long side (the side along the longitudinal direction) of the reflecting prism is limited.

Embodiment 4

Figure 10:
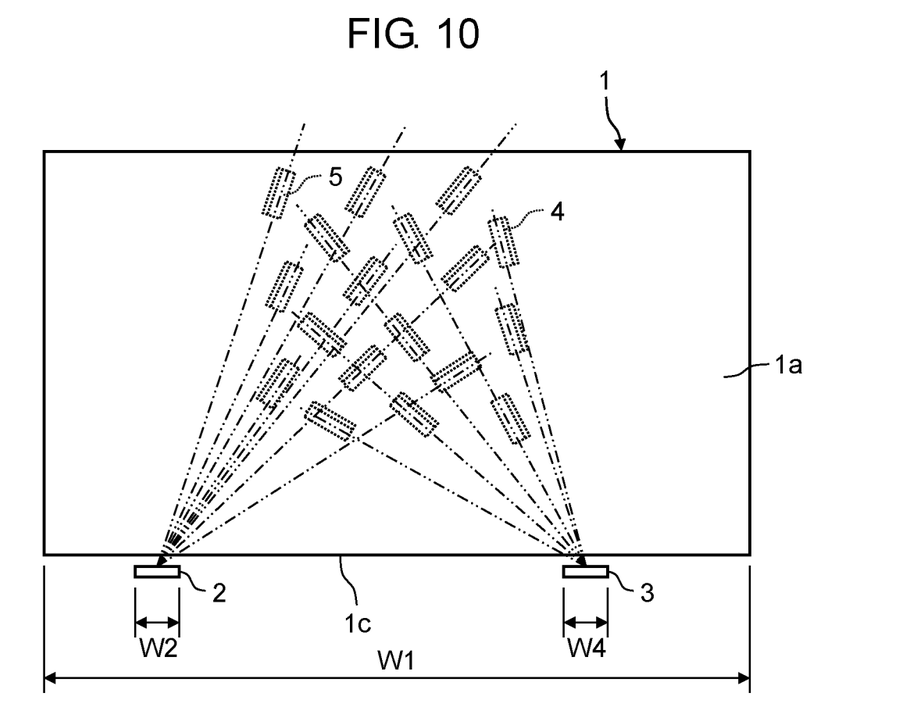
FIG. 10 is a plan view of the display device according to Embodiment 4.
Figure 11A:
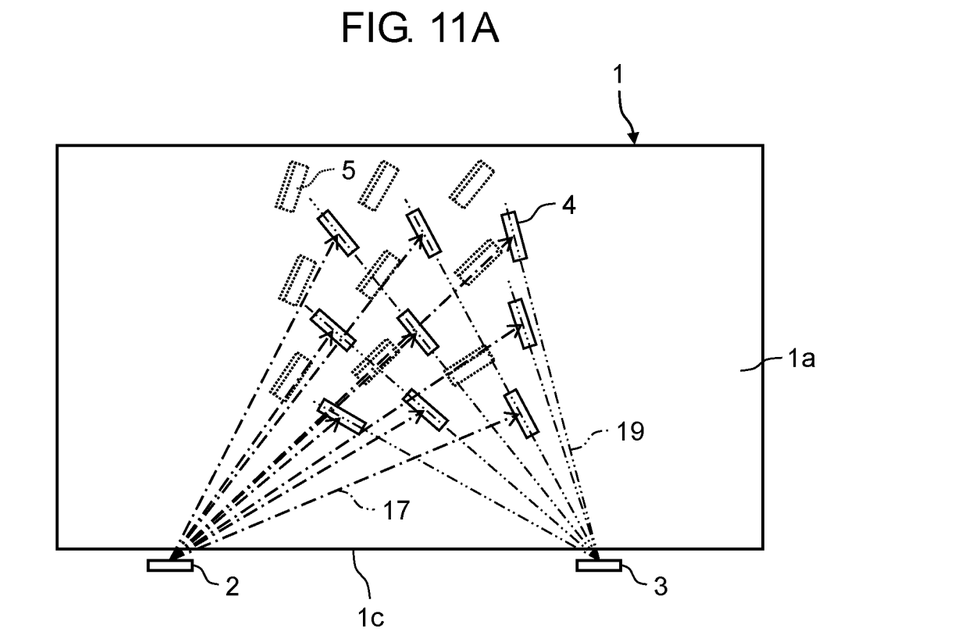
FIG. 11A is an explanatory diagram of a display state of the display device according to Embodiment 4.
Figure 11B:
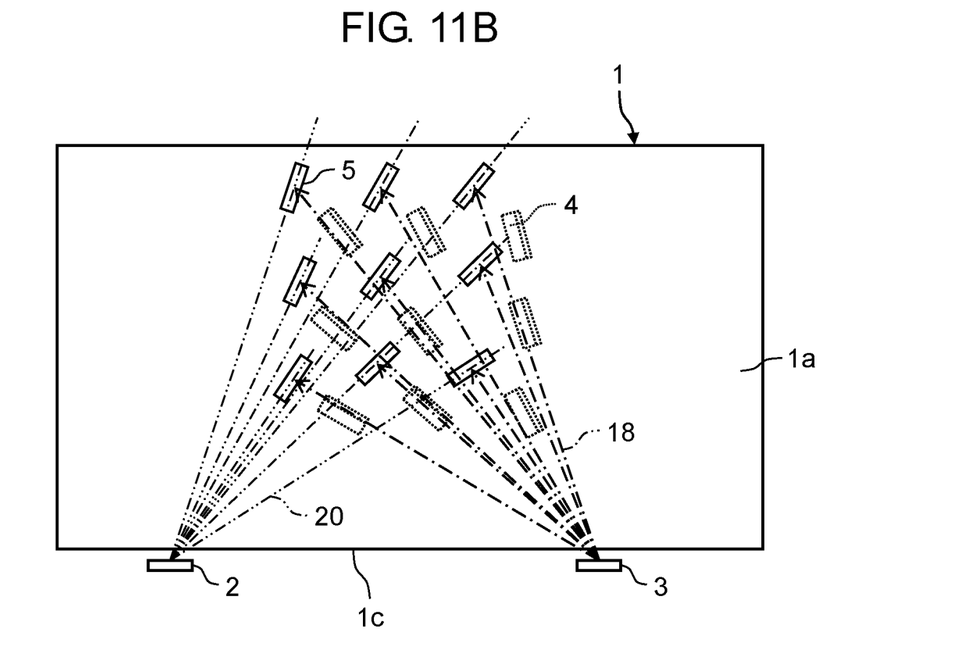
FIG. 11B is an explanatory diagram of a display state of the display device according to Embodiment 4.

FIG. 10 and FIGS. 11A and 11B show a display device according to Embodiment 4 of the present disclosure.

In each of the above embodiments, the light from first light source 2 is incident on first side surface 1c of light guide plate 1, and the light from second light source 3 is directly incident from second side surface 1d which is different from first side surface 1c. However, shown in FIGS. 10, 11A and 11B, Embodiment 4 is different from Embodiments 1 to 3 in that the light from first light source 2 and the light from second light source 3 are incident on first side surface 1c of light guide plate 1, and the others are the same.

That is, first light source 2 and second light source 3 which are separated from each other are placed along first side surface 1c of light guide plate 1. Then, the light from first light source 2 and second light source 3 is made incident on first side surface 1c of light guide plate 1. Width W2 of first light source 2 and width W4 of second light source 3 are narrower than width W1 of first side surface 1c, respectively.

As in the above embodiments, first reflecting prism 4 and second reflecting prism 5 are formed such that longitudinal directions F4 and F5 of the prisms are parallel to the directions formed by the light sources to which the prisms do not face (correspond) and the prisms. FIG. 11A shows a display state in which light from first light source 2 is reflected by first inclined surface 14 of first reflecting prism 4. FIG. 11B shows a display state in which light from second light source 3 is reflected by first inclined surface 14 of second reflecting prism 5.

First reflecting prism 4 is formed such that longitudinal direction F4 of first reflecting prism 4 and line 19 connecting the center of second light source 3 and the center of first reflecting prism 4 are parallel. Second reflecting prism 5 is formed such that longitudinal direction F5 of second reflecting prism 5 and line 20 connecting the center of first light source 2 and the center of second reflecting prism 5 are parallel.

Furthermore, width W4 of second light source 3 is narrower than width W1 of first surface 1c of light guide plate 1. Therefore, there is very little light obliquely incident on first reflecting prism 4 from second light source 3. As a result, it is possible to avoid the unnecessary pattern letter "A" appearing thin during the display of the letter "B", and the letter "B" is clearly displayed. Likewise, it is possible to avoid the unnecessary pattern letter "B" appearing thin during the display of the letter "A", and the letter "A" is clearly displayed.

With the above configuration, it is possible to realize a display device that does not display an unnecessary picture as described in Embodiment 1.

First reflecting prism 4 and second reflecting prism 5 in each of the above embodiments are formed such that longitudinal directions F4 and F5 of the prisms are parallel to the directions formed by the light sources to which the prisms do not face (correspond) and the prisms. However, first reflecting prism 4 and second reflecting prism 5 may be formed such that longitudinal directions F4 and F5 of the prisms are substantially parallel to the directions formed by the light sources to which the prisms do not face (correspond) and the prisms. Specifically, first reflecting prism 4 and second reflecting prism 5 may be placed such that the angles between longitudinal directions F4 and F5 of the prisms and the directions formed by the light sources to which the prisms do not face (correspond) and the prisms are 30° or less. This is because, when the angles are 30° or more, the light from the light source to which the prism does not face (correspond) causes a component which is emitted from the light guide plate after being reflected by the first inclined surface of the prism.

Since both of first reflecting prism 4 and second reflecting prism 5 of each of the above embodiments are formed such that longitudinal directions F4 and F5 of the reflecting prisms are parallel or substantially parallel to the directions formed by the light sources to which the reflecting prisms do not face (correspond) and the reflecting prisms, the pattern displayed by second reflecting prism 5 is not displayed thinly in the display state of the pattern displayed by first reflecting prism 4. Moreover, even in the display state of the pattern displayed by second reflecting prism 5, the pattern displayed by first reflecting prism 4 is not displayed thinly. However, it is also possible to form the longitudinal direction of one reflecting prism of first reflecting prism 4 and second reflecting prism 5 so as to be parallel or substantially parallel to the direction formed by the light source to which the reflecting prism does not face (correspond) and the prism. With this configuration, in the display state of the pattern displayed by the other reflecting prism of first reflecting prism 4 and second reflecting prism 5, an unnecessary picture is displayed thinly, but in a case of the display state of the pattern displayed by one of the reflecting prisms, it is possible to achieve a good display state in which an unnecessary pattern is not displayed.

Specifically, it is preferable that W1/2≥W2 and W1/2≥W4 so that widths W2 and W4 are narrower than width W1. When widths W2 and W4 are larger than W1/2, even if the reflecting prism is directed to the center of the light source, the light from the light source located at the end is reflected by the prism, is emitted from light guide plate 1, and appears as an unnecessary pattern.

Also in the above embodiment, as in Embodiment 1, it is desirable that the size of the light source is limited with respect to the size of the prism display region. In addition, it is desirable that the angle between the line segment connecting the end of the light source and the reflecting prism not to be displayed and the long side of the reflecting prism is limited.

According to the configuration of the present disclosure, it is possible to reduce light incident on the prism from the light source on the opposite side by narrowing the width of the light source as compared with the width of the light guide plate. Therefore, when one of the light sources of the light guide plate is caused to emit light, reflected light from the prism which is not to be displayed may be unlikely to emit from the light guide plate. Therefore, it is possible to obtain a display device in which information not to be displayed does not overlap and is not displayed.

The present disclosure contributes to an improvement in the quality of a display used for electric appliances, devices, and the like for home, industrial use, in-vehicle use, or the like, or a display of a switch having an input function.

What is claimed is:

1. A display device comprising:
   a light guide plate that includes
   a main surface,
   a bottom surface opposite to the main surface,
   a first side surface formed between the main surface and the bottom surface,
   a second side surface formed between the main surface and the bottom surface and intersecting with the first side surface,
   a first reflecting prism having an inclined surface that reflects light incident on the bottom surface from the first side surface toward the main surface, and
   a second reflecting prism having an inclined surface that reflects light incident on the bottom surface from the second side surface toward the main surface;
   a first light source that causes light to be incident on the first side surface of the light guide plate;
   a second light source that causes light to be incident on the second side surface of the light guide plate; and
   a light transmitting portion that is placed on a side of the main surface of the light guide plate, and transmits and scatters the light emitted from the main surface,
   wherein a longitudinal direction of the inclined surface of the first reflecting prism is parallel or substantially parallel to a line connecting the second light source and the inclined surface of the first reflecting prism,
   wherein a longitudinal direction of the inclined surface of the second reflecting prism is parallel or substantially parallel to a line connecting the first light source and the inclined surface of the second reflecting prism,
   wherein the first reflecting prism is one of a plurality of the first reflecting prisms, and
   when a width of a region in which the plurality of first reflecting prisms are placed is Wp, a width of the second light source facing the plurality of first reflecting prisms is Wo, and an angle formed between a longitudinal direction of the inclined surfaces of the plurality of first reflecting prisms and a direction of a line segment connecting a center point of the inclined surfaces of the plurality of first reflecting prisms and an end point of a light emitting portion of the second light source not facing the first reflecting prisms is θp, Wo/Wp≤¼ and |θp|≤30° are satisfied.

2. The display device of claim 1,
   wherein a cross-sectional shape of the first reflecting prism is triangular or trapezoidal,
   when an angle between a surface of the first reflecting prism which reflects light and the bottom surface of the light guide plate is θa and an angle between a side surface of the first reflecting prism and the bottom surface of the light guide plate is θc, θa<θc is satisfied.

3. The display device of claim 2,
   wherein the angle θc satisfies θc<90°.

4. The display device of claim 2,
   wherein the angle θa satisfies 35°<θa<65°.

5. The display device of claim 1,
   wherein a cross-sectional shape of the second reflecting prism is triangular or trapezoidal,
   when an angle between a surface of the second reflecting prism which reflects light and the bottom surface of the light guide plate is θa and an angle between a side surface of the second reflecting prism and the bottom surface of the light guide plate is θc, θa<θc is satisfied.

6. The display device of claim 5, wherein the angle θc satisfies θc<90°.

7. The display device of claim 5, wherein the angle θa satisfies 35°<θa<65°.

8. The display device of claim 1, wherein the substantially parallel is 30° or less.

9. The display device of claim 1, wherein the first side surface of the light guide plate and the second side surface adjacent the first side surface are orthogonal to each other.

10. The display device of claim 1, wherein in the light guide plate, the first reflecting prism and the second reflecting prism are not placed on a line connecting the first light source and the second light source.

11. A display device comprising:
a light guide plate that includes
    a main surface,
    a bottom surface opposite to the main surface,
    a side surface formed between the main surface and the bottom surface, and
    a reflecting prism having an inclined surface that reflects light incident on the bottom surface from the side surface toward the main surface;
a first light source and a second light source that cause light to be incident on the side surface of the light guide plate at mutually different angles; and
a light transmitting portion that is placed on a side of the main surface of the light guide plate, and transmits and scatters the light emitted from the main surface,
wherein the reflecting prism of the light guide plate includes:
    a first reflecting prism that reflects light incident from the first light source on the inclined surface to the side of the main surface of the light guide plate, and
    a second reflecting prism that reflects light incident from the second light source on the inclined surface to the side of the main surface of the light guide plate, and
a longitudinal direction of the inclined surface of the first reflecting prism is parallel or substantially parallel to a line connecting the second light source and the inclined surface of the first reflecting prism,
wherein a longitudinal direction of the inclined surface of the second reflecting prism is parallel or substantially parallel to a line connecting the first light source and the inclined surface of the second reflecting prism,
wherein the first reflecting prism is one of a plurality of the first reflecting prisms, and
when a width of a region in which the plurality of first reflecting prisms are placed is Wp, a width of the second light source facing the plurality of first reflecting prisms is Wo, and an angle formed between a longitudinal direction of the inclined surfaces of the plurality of first reflecting prisms and a direction of a line segment connecting a center point of the inclined surfaces of the plurality of first reflecting prisms and an end point of a light emitting portion of the second light source not facing the first reflecting prisms is θp, Wo/Wp≤¼ and |θp|≤30° are satisfied.

* * * * *